US011223192B2

(12) United States Patent
Li et al.

(10) Patent No.: US 11,223,192 B2
(45) Date of Patent: Jan. 11, 2022

(54) LEAKAGE CURRENT PROTECTION DEVICE WITH AUTOMATIC OR MANUAL RESET AFTER POWER OUTAGE

(71) Applicant: Chengli Li, Suzhou (CN)

(72) Inventors: Chengli Li, Suzhou (CN); Guolan Yue, Suzhou (CN); Long Chen, Suzhou (CN)

(73) Assignee: Chengli Li, Suzhou (CN)

( * ) Notice: Subject to any disclaimer, the term of this patent is extended or adjusted under 35 U.S.C. 154(b) by 104 days.

(21) Appl. No.: 16/746,510

(22) Filed: Jan. 17, 2020

(65) Prior Publication Data

US 2021/0210946 A1   Jul. 8, 2021

(30) Foreign Application Priority Data

Jan. 6, 2020 (CN) .......................... 202010009758.7
Jan. 6, 2020 (CN) .......................... 202020017820.2
Jan. 15, 2020 (CN) .......................... 202010040892.3
Jan. 15, 2020 (CN) .......................... 202020082370.5

(51) Int. Cl.
*H02H 3/06* (2006.01)
*H02H 3/10* (2006.01)
*H02H 3/26* (2006.01)

(52) U.S. Cl.
CPC .............. *H02H 3/105* (2013.01); *H02H 3/06* (2013.01); *H02H 3/26* (2013.01)

(58) Field of Classification Search
CPC ............. H02H 3/06; H02H 3/26; H02H 3/105
See application file for complete search history.

(56) References Cited

U.S. PATENT DOCUMENTS

| 2015/0309103 | A1* | 10/2015 | Ostrovsky | H02H 3/335 |
| | | | | 324/509 |
| 2016/0225562 | A1* | 8/2016 | Franks | H02H 3/08 |
| 2017/0222425 | A1* | 8/2017 | Li | H02H 3/02 |
| 2018/0261993 | A1* | 9/2018 | Kurniawan | H02H 3/05 |
| 2019/0341766 | A1* | 11/2019 | Aromin | H01H 13/14 |
| 2020/0041567 | A1* | 2/2020 | Armstrong | G01R 31/3277 |

* cited by examiner

*Primary Examiner* — Peter M Novak
(74) *Attorney, Agent, or Firm* — Chen Yoshimura LLP

(57) ABSTRACT

A leakage current protection device with automatic reset after power outage includes a switch, a power supply module, a leakage current detection module, a self-testing module, a drive control module, and a first reset module. The drive control module drives the switch based on a leakage current signal from the leakage current detection module and/or a self-test fault signal from the self-testing module. The first reset module functions to automatically set the leakage current protection device in a connected state when power resumes after an outage. Another leakage current protection device with manual reset after power outage includes similar components above and also a second reset module, which functions to automatically set the leakage current protection device in a disconnected state when power resumes after an outage; the device can then be manually reset using a reset switch. These two devices can suit different needs of different electrical appliances.

17 Claims, 2 Drawing Sheets

LEAKAGE CURRENT PROTECTION DEVICE WITH AUTOMATIC OR MANUAL RESET AFTER POWER OUTAGE

BACKGROUND OF THE INVENTION

Field of the Invention

This invention relates to electrical appliances, and in particular, it relates to a leakage current (including ground fault) protection device with automatic or manual reset function when power resumes after an outage.

Description of Related Art

With the increasing awareness of electrical safety of electrical appliances, leakage current protection devices have become widely used. Due to differences in the connected appliance or environment, there are different requirements for the reset state of the leakage current protection devices after the electric power is connected or resumed after a power outage. For example, for a leakage current protection device used for a refrigerator or freezer, it is desired that when power is resumed after an outage, the leakage current protection device be automatically set to a connected state, so that the electrical appliance can work normally to reduce damage to the content stored in the refrigerator or freezer. On the other hand, for a leakage current protection device used for an electrical tool such as a cutting machine or other tools, it is desired that when power is resumed after an outage, the leakage current protection device be automatically set to a disconnected state, and require manual resetting to be connected, in order to ensure safety.

Therefore, there is a need for leakage current protection devices with desired reset functions after a power outage and that are easy to install and cost effective.

SUMMARY

Accordingly, the present invention is directed to a leakage current protection device with automatic or manual reset after power outage that substantially obviates one or more of the problems due to limitations and disadvantages of the related art.

To achieve the above objects, the present invention provides a leakage current protection device with automatic reset power outage and resumption, which includes: power lines, a switch module, a power supply module, a leakage current detection module, a drive control module, and a reset module. The power lines have an input end and an output end. The switch module is coupled on the power lines, and is configured to electrically connect or disconnect the input end and the output end. The power supply module is coupled to the input end, and is configured to generate a working power. The leakage current detection module is coupled to the power lines on the output side, and is configured to detect whether a leakage current is present on the power lines on the output side and to generate a leakage current signal when a leakage current is detected. The drive control module is coupled to the leakage current detection module and the switch module, and is configured to drive the switch module in response to the leakage current signal received from the leakage current detection module to electrically disconnect the input end and the output end. The reset module is coupled to the power supply module and the drive control module, and is configured to automatically control the drive control module to drive the switch module to electrically connect the input end and output end when power is resumed at the input end after a power outage.

In some embodiments, the power supply module is configured to supply a working power to the drive control module.

In some embodiments, the drive control module includes: a relay coil coupled to the reset module, configured to control the switch module; a drive control circuit coupled to the relay coil and the leakage current detection module, configured to control a current through the relay coil based on the received leakage current signal; and a manual reset switch coupled to the drive control circuit, configured to reset the drive control circuit after the leakage current signal is received.

In some embodiments, the drive control circuit includes a second transistor having a current path coupled in parallel with the reset switch, and having a control electrode coupled to the leakage current detection module to receive the leakage current signal. The second transistor is configured to become conductive in response to receiving the leakage current signal at its control electrode, and configured to become non-conductive in response to the reset switch being closed. The current path of the second transistor is coupled in parallel with a current path of the relay coil.

In some embodiments, the reset module includes: a first capacitor, a first resistor and a second resistor, and a first transistor. The first capacitor is coupled between the power supply module and ground. The first resistor and second resistor are coupled in series to form a voltage divider circuit. The voltage divider circuit is coupled in parallel to the first capacitor. The first transistor has a current path coupled in series with the relay coil and a control electrode coupled to the voltage divider circuit. The power supply module is configured to charge the first capacitor when power is resumed at the input end. The voltage divider circuit triggers the first transistor to become conductive based on a charged voltage of the first capacitor. When the first transistor is conductive, a current flows through the relay coil and the relay coil controls the switch module to electrically connect the input end and the output end.

In some embodiments, the device further includes a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault. The drive control circuit of the drive control module is further coupled to the self-testing module and configured to control the relay coil based on the self-test fault signal received from the self-testing module.

In some embodiments, the first transistor is a MOS (metal-oxide-semiconductor) transistor, a silicon controlled rectifier, or a bipolar junction transistor.

In another aspect, the present invention provides a leakage current protection device with manual reset after power outage and resumption, which includes: power lines, a switch module, a power supply module, a leakage current detection module, a drive control module, and a reset module. The power lines have an input end and an output end. The switch module is coupled on the power lines, and is configured to electrically connect or disconnect the input end and the output end. The power supply module coupled to the input end, and is configured to generate a working power. The leakage current detection module is coupled to the power lines on the output side, and is configured to detect whether a leakage current is present on the power lines on the output side and to generate a leakage current signal when a leakage current is detected. The drive control module is coupled to the leakage current detection module and the switch module, and is configured to drive the switch module in response to the leakage current signal received from the leakage current detection module or a trip signal to electrically disconnect the input end and the output end. The reset module is coupled to the input end and the drive control module, and is configured to automatically generate the trip signal when power is resumed at the input end after a power outage. In response to the trip signal, the drive control module drives the switch module to electrically disconnect the input end and output end.

In some embodiment, the drive control module includes: a relay coil coupled to the reset module, configured to control the switch module; a drive control circuit coupled to the relay coil and the leakage current detection module, configured to control the relay coil based on the received leakage current signal or the trip signal; and a manual reset switch coupled to the drive control circuit, configured to reset the drive control circuit after the leakage current signal or the trip signal is received.

In some embodiment, the drive control circuit includes: a second transistor having a current path coupled in parallel with the reset switch, and having a control electrode coupled to the leakage current detection module and the reset module to receive the leakage current signal and the trip signal; wherein the second transistor is configured to become conductive in response to receiving the leakage current signal or the trip signal at its control electrode, and configured to become non-conductive in response to the reset switch being closed, and wherein the current path of the second transistor is coupled in parallel with a current path of the relay coil.

In some embodiment, the reset module includes: a third resistor and a fourth resistor coupled to the input end; a fifth resistor and a second capacitor couple in parallel with each other and then coupled in series with the third resistor; a fourth transistor having a current path coupled in series with the fourth resistor and a control electrode coupled to a node between the third resistor and the fifth resistor; and a second diode coupled from a node between the fourth resistor and the fourth transistor to the drive control circuit, wherein the fourth resistor and the second diode generate the trip signal when power is resumed at the input end after a power outage.

In some embodiments, after the trip signal is generated, when the input end charges the second capacitor to a predetermined voltage, a voltage across the second capacitor triggers the fourth transistor to become conductive which stops the trip signal.

In some embodiments, when a voltage applied at the input end is lower than the predetermined voltage, the fourth transistor is non-conductive, and the fourth resistor and the second diode generate the trip signal.

In some embodiments, the device further includes another reset module, including: a first capacitor coupled between the power supply module and ground; a first resistor and a second resistor coupled in series to form a voltage divider circuit, wherein the voltage divider circuit is coupled in parallel to the first capacitor; and a first transistor having a current path coupled in series with the relay coil and a control electrode coupled to the voltage divider circuit; wherein the power supply module is configured to charge the first capacitor when power is resumed at the input end, wherein the voltage divider circuit triggers the first transistor to become conductive based on a charged voltage of the first capacitor, and wherein when the first transistor is conductive, a current flows through the relay coil, and the relay coil controls the switch module to electrically connect the input end and the output end.

In some embodiments, the device further includes a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault; wherein the drive control circuit of the drive control module is further coupled to the self-testing module and configured to control the relay coil based on the self-test fault signal received from the self-testing module.

In some embodiment, the second transistor is a MOS (metal-oxide-semiconductor) transistor, a silicon controlled rectifier, or a bipolar junction transistor.

In some embodiment, the fourth transistor is a MOS (metal-oxide-semiconductor) transistor, a silicon controlled rectifier, or a bipolar junction transistor.

Compared to conventional technology, embodiments of the present invention provides leakage current protection devices respectively having automatic and manual reset functions after power outage, which can meet the different requirements by different types of electrical appliances.

BRIEF DESCRIPTION OF THE DRAWINGS

Embodiments of the present invention are described with reference to the following drawings. These drawing serve to explain the principle of the invention, and only shows necessary components for understanding the principle of the invention. The drawings are not necessarily to scale. In the drawings, similar components may be designated by similar reference symbols.

DETAILED DESCRIPTION OF PREFERRED EMBODIMENTS

Figure 1:
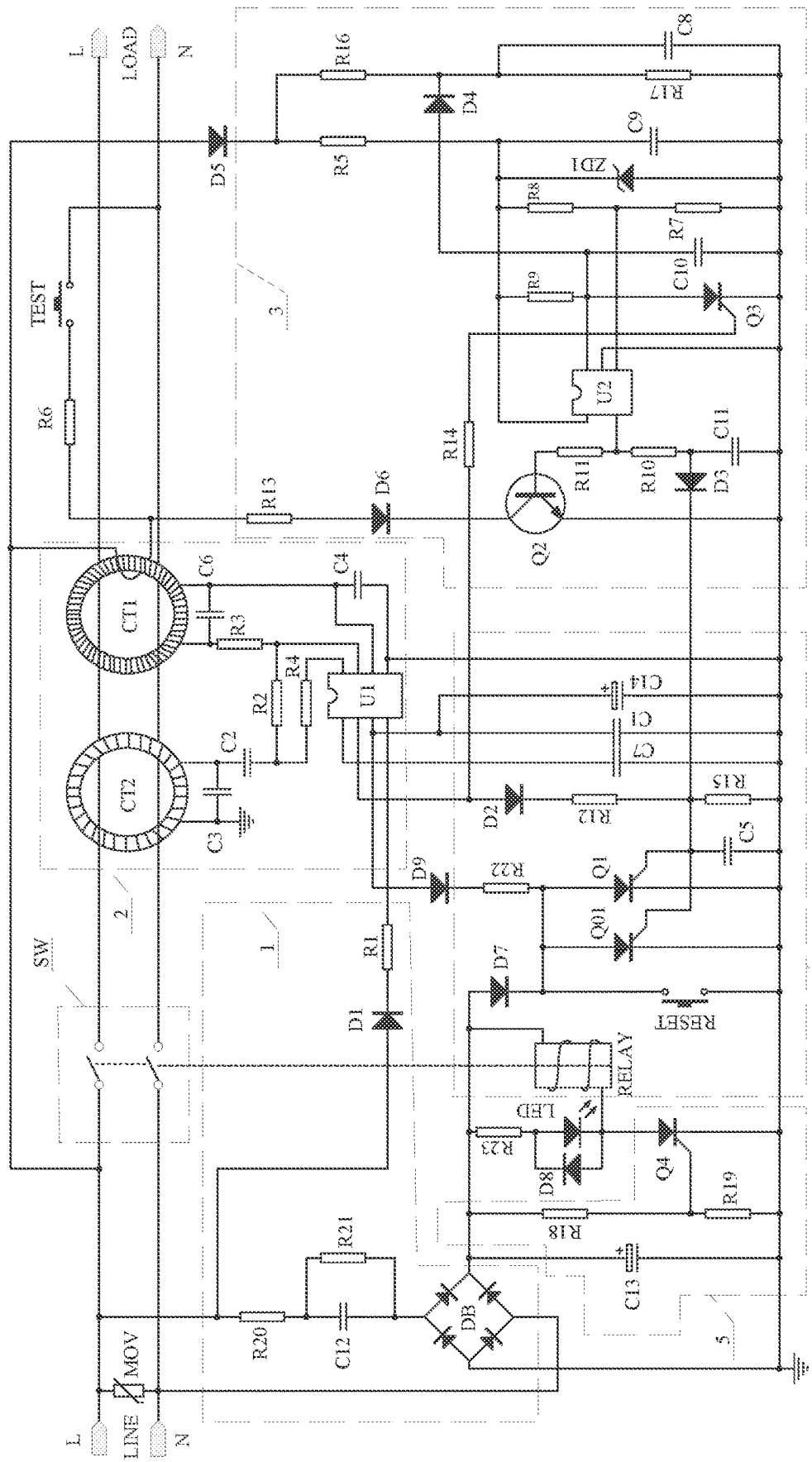
FIG. 1 is a circuit diagram of a leakage current protection device according to a first embodiment of the present invention.

The preferred embodiments are described below with reference to the drawings. The drawings are exemplary only. The described embodiments are not all possible embodiments of the present invention. It should be understood that other embodiments are possible, and the illustrated embodiments may be changed structurally or logically without departing from the spirit of the invention. The descriptions below are not limiting. The scope of the invention is defined by the appended claims.

Technologies, methods and devices that are well known to those of ordinary skill in the art will not be discussed in detail here; when suitable, they may be considered a part of the specification. In the drawings, the lines that connect various components are only drawn for illustrative purpose; the lines indicate that the two components at the two ends of the lines are communicatively coupled to each other. However, components that are not connected by lines may also communicate with each other.

A problem being addressed by embodiments of the present invention is to meet the different requirements, as imposed by the respective connected appliances, for the reset state of the leakage current protection device when the power resumes after an outage.

To solve the above problem, embodiments of the present invention provide a leakage current protection device with automatic or manual reset functions, the device including: a switch module, a power supply module, a leakage current detection module, a self-testing module, a drive control module, and a first reset module. The switch module functions to control the power connection between the input end and output end of the device. The leakage current detection module functions to detect whether a leakage current is present on the power lines at the output end, and generate a leakage current signal in response to detecting a leakage current. The self-testing module functions to periodically generate a self-test pulse signal that simulates the leakage current, to test whether the leakage current detection module has a fault, and generate a self-test fault signal when detecting such a fault. The drive control module functions to drive the switch module based on received leakage current signal and/or self-test fault signal. The first reset module functions to set the leakage current protection device in a connected state when external power is lost and then resumed.

First Embodiment

As shown in FIG. 1, in the first embodiment, the leakage current protection device has an automatic reset function after a power outage and resumption. The device includes a switch module SW, a power supply module 1, a leakage current detection module 2, a self-testing module 3, a drive control module 4, and first reset module 5. The switch module SW include mechanical switches coupled on the power lines (hot line L and neutral line N) between the input end (LINE, to be coupled to the external power source) and the output end (LOAD, to be coupled to an electrical load), and controls the electrical connection between the input and output ends. The power supply module 1 is coupled to the input end, and supplies a working power to the leakage current protection device. The leakage current detection module 2 is coupled to the power lines on the output side (between the switch and the output end), and functions to detect whether a leakage current is present on the power lines on the output side and to generate a leakage current signal when a leakage current is detected. The self-testing module 3 is coupled to the input end and the leakage current detection module 2; it periodically generates a self-test pulse signal that simulates the leakage current to test whether the leakage current detection module 2 has a fault, and generates a self-test fault signal when detecting such a fault. The drive control module 4 is coupled to the leakage current detection module 2, the self-testing module 3 and the switch module SW, and functions to drive the switch module SW based on the leakage current signal from the leakage current detection module 2 and/or the self-test fault signal from the self-testing module 3 indicating a fault in the leakage current detection module 2. The first reset module 5 is coupled to the power supply module 1 and the drive control module 4, and functions to set the leakage current protection device to a connected state (i.e. the input and output ends are connected) when the external power at the input end is lost (e.g., due to a power outage) and then resumed. The power supply module 1 supplies a working power to the drive control module 4.

As shown in FIG. 1, the drive control module 4 includes: a relay coil RELAY, a reset switch RESET, and a drive control circuit. The relay coil RELAY is coupled to the first reset module 5, and functions to control the switch module SW. The drive control circuit is coupled to the relay coil RELAY, the leakage current detection module 2 and the self-testing module 3, and functions to control the relay coil RELAY based on the received leakage current signal and/or self-test fault signal. The reset switch RESET is manual switch coupled to the drive control circuit, and is used to manually reset the drive control module 4 after the device trips due to the leakage current signal and/or self-test fault signal.

More specifically, the drive control circuit includes at least: first diode D7, second transistor Q01 and third transistor Q1. The second transistor Q01 and the third transistor Q1 are coupled in parallel, and are then coupled in series with the second diode D7. The reset switch RESET is coupled in parallel with transistors Q01 and Q1. The current path of the second diode D7 and transistors Q01 and Q1 is coupled in parallel with the current path of the relay coil RELAY. The control electrodes (gates) of transistors Q01 and Q1 are coupled to the leakage current detection module 2 and the self-testing module 3. In this embodiment, the second transistor Q01 and/or third transistor Q1 function to control the relay coil RELAY based on the leakage current signal and/or the self-test fault signal, received at their gates.

As shown in FIG. 1, the first reset module 5 includes: first capacitor C13, first voltage divider resistor R18, second voltage divider resistor R19, and first transistor Q4. In this embodiment, the first capacitor C13 is coupled between the power supply module 1 and ground. The first and second voltage divider resistors R18 and R19 are coupled in series to form a voltage divider which is coupled in parallel to the first capacitor C13. The gate of the first transistor Q4 is coupled to the point between the first and second voltage divider resistors R18 and R19, and the current path of the first transistor Q4 is coupled in series with the relay coil RELAY.

In this embodiment, when the external power is applied to the input end, the power supply module 1 charges the first capacitor C13, so that the voltage across the second voltage divider resistor R19 rises to trigger the first transistor Q4 to become conductive. Therefore, a current flows through the relay coil RELAY, which causes the switch SW to close.

In this embodiment, the first transistor Q4 may be a MOS (metal-oxide-semiconductor) transistor, silicon controlled rectifier, a bipolar junction transistor, and/or any other suitable semiconductor switching device.

As shown in FIG. 1, the leakage current detection module 2 includes a leakage current detection ring CT1 through which the hot (L) and neutral (N) lines pass, a neutral line detection ring CT2, and a leakage current detection circuit coupled to the leakage current detection ring CT1. The leakage current detection circuit includes a leakage current detection chip U1 and related electrical components coupled thereto, such as capacitor C4. When there is a current imbalance between the hot line (L) and neutral line (N) that pass through the leakage current detection ring CT1, i.e., when there is a leakage current, the leakage current detection ring CT1 generates a corresponding voltage signal. When the leakage current detection chip U1 detects that this voltage signal exceeds a predetermined threshold, it outputs a signal (the leakage current signal) to control transistor Q1 and/or transistor Q01 to become conductive. Note that transistors Q1 and Q01 (two transistors are provided in parallel here for redundancy) are parts of the drive control circuit of the drive control module 4; their current paths are connected in parallel with the current path of the relay coil RELAY. When transistor Q1 and/or Q01 are conductive, current no longer flows through the relay coil RELAY, which causes the relay to move and open the switch SW.

In this embodiment, the self-testing module 3 performs periodic testing of the proper function of the leakage current detection module 2. The self-testing module 3 includes a power supply circuit, a periodic timing circuit, and a self-test pulse signal generating circuit that generates a pulse current signal which simulates a leakage current. Referring to FIG. 1, the power supply circuit includes resistor R5 and voltage regulator (Zener diode) ZD1. The periodic timing circuit includes resistor R9 and timing element (e.g., capacitor C10) coupled in series, for generating a timing interval of the self-test pulse signal. The self-test pulse signal generating circuit includes transistor Q2, comparator U2, diode D3, capacitor C11, resistor R10, and resistors R13 and R11 coupled to the transistor Q2. When the leakage current protection device operates, the self-testing module 3 periodically applies a simulated leakage current to the leakage current detection ring CT1, where the simulated leakage current exceeds a predetermined threshold.

Further, in this embodiment, the output of comparator U2 of the self-testing module 3 is coupled to transistor Q1 and/or Q01, and triggers transistor Q1 and/or Q01 to become conductive in response to the received self-test fault signal, so as to control the relay coil RELAY to disconnect or connect the switch SW. The working principle of the self-testing module 3 is similar to that described in commonly owned U.S. Pat. Appl. Pub. No. 2018/0109102, which is incorporated by reference in its entirety here.

The working principle of this embodiment is as follows:

When the external power to the leakage current protection device is lost and then resumed, i.e., when external power is again applied to the input end LINE power after it is lost, resistors R20, capacitor C12, and diode rectifier bridge DB of the power supply module 1 generate a DC current to charge capacitor C13. When the voltage across capacitor C13 continuously rises, the voltage across resistor R19 of the voltage divider rises to a certain level, which triggers the first transistor Q4 to become conductive. Therefore, the relay coil RELAY and the first transistor Q4 form a current path, which causes the relay coil RELAY to pull the replay plunger to close the switch SW. As a result, the electrical power is connected to the output end. This way, the leakage current protection device is automatically reset (i.e. become connected) when the external power is resumed. There is no need to manually close the reset button RESET in this situation.

When the drive control module 4 receives the leakage current signal and/or the self-test fault signal, transistor Q1 and/or Q01 become conductive, so no current flows through the relay coil RELAY, which in turn causes the switch SW to open, so that the leakage current protection device stops outputting power at the output end. Thereafter, when the leakage and/or fault problems are resolved and the leakage current signal and/or the self-test fault signal stop, and then the reset switch RESET is manually depressed (closed), transistor Q1 and/or Q01 will become non-conductive (and will remain non-conductive after the reset switch RESET is released (open)). After the transistor Q1 and/or Q01 become non-conductive, the first reset module 5 will function normally, so if an external power is applied at the input end LINE, the leakage current protection device will reset in the above described manner (by charging capacitor C13) and start to work normally. If the leakage current and/or fault problems are not resolved, transistor Q1 and/or Q01 will continue to become conductive even if the reset switch RESET is pressed, so the device cannot reset. In this embodiment, transistors Q1 and Q01 are preferably silicon controlled rectifiers.

The leakage current protection device in this embodiment has an automatic reset function, and is suitable for electrical appliances that are expected to automatically be reconnected when power is resumed after an outage, to ensure their normal operation. The leakage current protection device with automatic reset function according to this embodiment can use the first reset module 5 to achieve automatic reset when power is resumed after an outage, which satisfies the automatic rest need of some appliances.

Second Embodiment

Figure 2:
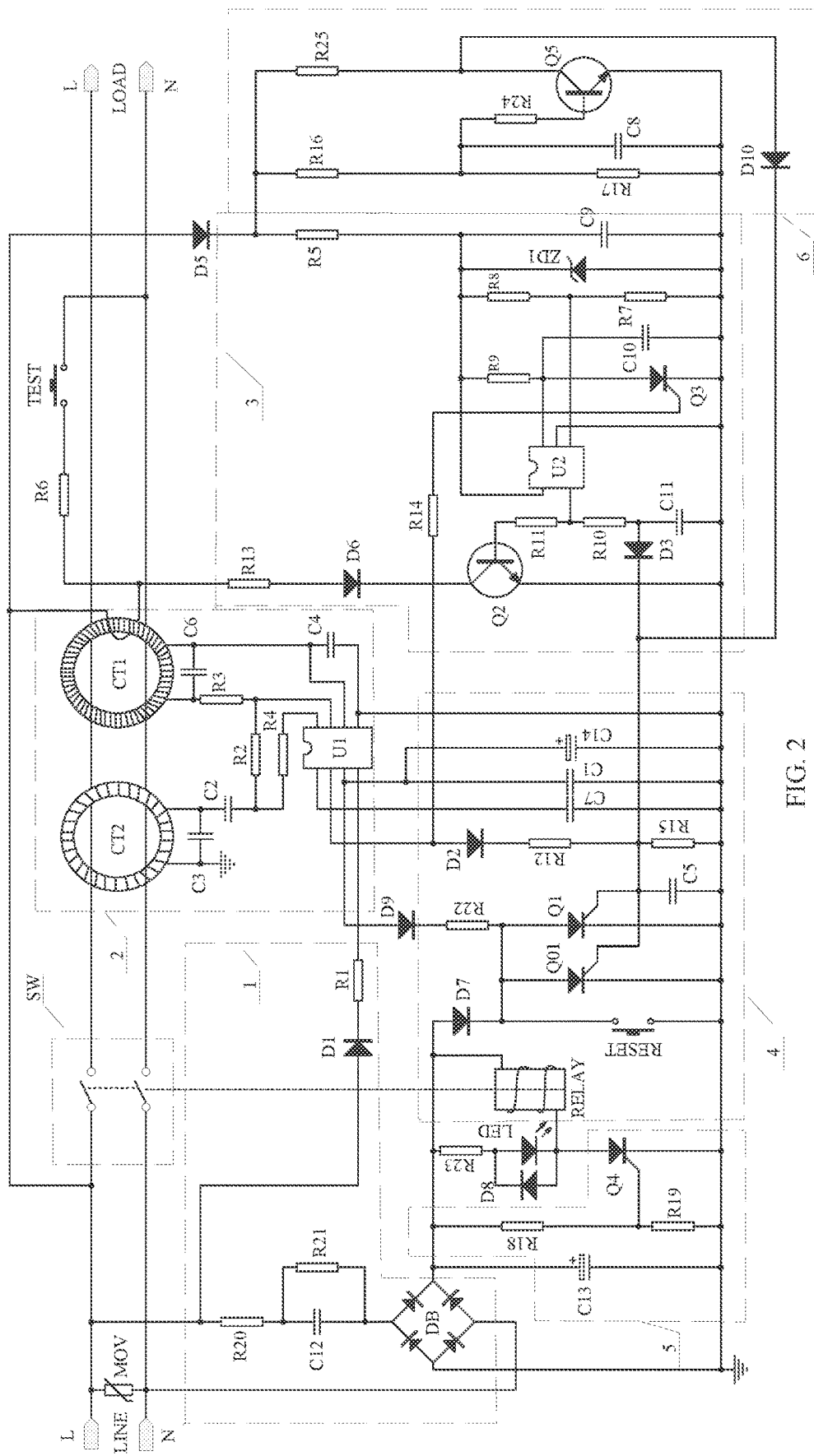
FIG. 2 is a circuit diagram of a leakage current protection device according to a second embodiment of the present invention.

As shown in FIG. 2, in a second embodiment, the leakage current protection device has a manual reset function after a power outage and resumption. The device includes a switch module SW, a power supply module 1, a leakage current detection module 2, a self-testing module 3, a drive control module 4, a first reset module 5 and a second reset module 6. The structures and functions of the switch module SW, power supply module 1, leakage current detection module 2, and self-testing module 3 are similar to those of the first embodiment and will not be described in detail here.

In this embodiment, the drive control module 4 is coupled to the leakage current detection module 2, self-testing module 3 and switch module SW, and functions to drive the switch module SW based on one or more of a received leakage current signal, self-test fault signal, and trip signal. The first reset module 5 is coupled to the power supply module 1 and drive control module 4. When none of the leakage current signal, self-test fault signal, and trip signal exists, and the reset switch RESET is manually reset, the first reset module 5 controls the drive control module 4 to cause the switch SW to electrically connect the input and output ends. The second reset module 6 is coupled to the input end and to the drive control module 4, and functions to keep the leakage current protection device in the tripped state based on the trip signal when power is resumed after an outage.

As shown in FIG. 2, the drive control module 4 includes: relay coil RELAY, reset switch RESET, and a drive control circuit. The relay coil RELAY is coupled to the first reset module 5, and functions to control the switch SW. The drive control circuit is coupled to the relay coil RELAY, leakage current detection module 2, self-testing module 3, and second reset module 6, and functions to control the relay coil RELAY based on one or more of the leakage current signal, the self-test fault signal, and the trip signal from the second reset module 6. The reset switch RESET is coupled to the drive control circuit, and functions to reset the drive control module 4 (by causing transistors Q01 and/or Q1 to become non-conductive) after the device trips due to the leakage current signal and/or the self-test fault signal.

More specifically, the drive control circuit includes at least: first diode D7, second transistor Q01 and third transistor Q1. The second transistor Q01 and the third transistor Q1 are coupled in parallel, and are then coupled in series with the second diode D7. The reset switch RESET is coupled in parallel with transistors Q01 and Q1. The current path of the second diode D7 and transistors Q01 and Q1 is coupled in parallel with the current path of the relay coil RELAY. The gates of transistors Q01 and Q1 are coupled to the leakage current detection module 2, the self-testing module 3, and the second reset module 6. In this embodiment, the second transistor Q01 and/or third transistor Q1 function to control the relay coil RELAY based on one or more of the leakage current signal, the self-test fault signal, and the trip signal from the second reset module 6.

As shown in FIG. 2, the first reset module 5 includes: first capacitor C13, first voltage divider resistor R18, second voltage divider resistor R19, and first transistor Q4. In this embodiment, the first capacitor C13 is coupled between the power supply module 1 and ground; the first and second voltage divider resistors R18 and R19 are coupled in series to form a voltage divider which is coupled in parallel to the first capacitor C13. The gate of the first transistor Q4 is coupled to the point between the first and second voltage divider resistors R18 and R19, and the current path of the first transistor Q4 is coupled in series to the relay coil RELAY. When the external power is connected to the input end LINE, and none of the leakage current signal, the self-test fault signal and the trip signal exists, in response to the drive control module 4 having been reset, the power supply module 1 charges first capacitor C13 of the first reset module 5, so that the voltage across resistor R19 generates a trigger signal for the transistor Q4 of the drive control module 4. This causes the transistor Q4 to become conductive, which in turn causes the relay coil RELAY to control the switch SW to electrically connect the input and output ends.

Further, in this embodiment, as shown in FIG. 2, the second reset module 6 includes: third resistor R16 and fourth resistor R25 coupled to the input end (via a diode D5), second diode D10, second capacitor C8, fourth transistor Q5, and fifth resistor R17. The fifth resistor R17 and the second capacitor C8 are couple in parallel with each other and then coupled in series with the third resistor R16. The base of the fourth transistor Q5 is coupled to the node between resistors R16 and R17 via another resistor R24. The current path of the fourth transistor Q5 is coupled in series with the fourth resistor R25. The second diode D10 is coupled from the node between the fourth resistor R25 and the fourth transistor Q5 to the drive control circuit (more specifically, the gates of the second transistor Q01 and third transistor Q1). In this embodiment, when external power is resumed after an outage, a trip signal is generated from the input end via diode D5, the fourth resistor R25 and the second diode D10. This trip signal triggers the second transistor Q01 and/or third transistor Q1 to become conductive, and a current path is formed from the power supply module 1, the first diode D7, and the second transistor Q01 and/or third transistor Q1 to ground. As a result, no current flows through the relay coil RELAY, which causes the switch SW to remain in the open state.

Thus, in an initial period after the external power is resumed but before the second capacitor C8 is charged to a sufficient voltage, the second reset module 6 initially generates the trip signal at diode D10 in the above described manner. Thereafter, when the second capacitor C8 is charged by the input end to a predetermined, sufficiently high voltage (e.g., 90V), it triggers the fourth transistor Q5 to become conductive, causing the voltage across the fourth transistor Q5 to drop. As a result, the trip signal will stop being generated by the input end LINE diode D5, and the fourth resistor R25 and the second diode D10. This way, the second reset module 6 generates a transient trip signal when the power resumes after an outage.

On the other hand, if the voltage applied to the input end LINE is lower than the predetermined voltage (e.g., 90V), capacitor will never be charged to a sufficiently high voltage, so the fourth transistor Q5 remains non-conductive. As a result, the fourth resistor R25 and the second diode D10 generate the trip signal, which triggers the drive control circuit (more specifically, the second transistor Q01 and/or third transistor Q1) to become conductive. This in turn causes the current through the relay coil RELAY to stop, which causes the switch SW to be in the open state. In other words, if the input external power is not sufficiently high, the leakage current protection device will remain in a tripped state.

In this embodiment, each of the second transistor Q01, third transistor Q1, and fourth transistor Q5 may be a MOS (metal-oxide-semiconductor) transistor, a silicon controlled rectifier, a bipolar junction transistor, and/or any other suitable semiconductor switching device. Preferably, transistors Q1 and Q01 are silicon controlled rectifiers.

The working principle of this embodiment is as follows:
When the external power at the input end LINE is resumed after an outage, a trip signal is initially generated from the input end, diode D5, the fourth resistor R25 and the second diode D10. The trip signal triggers the second transistor Q01 and/or third transistor Q1 to become conductive and remain conductive, and a current path is formed by the power supply module 1, the first diode D7, and the second transistor Q01 and/or third transistor Q1 to ground. As a result, no current flows through the relay coil RELAY, so the relay coil RELAY cannot pull the relay plunger, which causes the switch SW to be in the open state. After the initial period, when the second capacitor C8 is charged to the predetermined voltage which is sufficiently high (e.g. 90V) to trigger the fourth transistor Q5 to become conductive, the trip signal is no longer generated by the input end LINE, diode D5, the fourth resistor R25 and the second diode D10. At this time, transistors (silicon controlled rectifiers) Q1 and/or Q01 remain in the conductive state, and switch SW remains open. Thus, the device is not automatically connected after power resumes.

In this state, manually depressing (closing) the reset switch RESET causes transistor Q1 and/or Q01 to become non-conductive. After the reset switch RESET is released (open), and while transistors Q1 and/or Q01 is still non-conductive, the first capacitor C13 is charged by the DC current generated by resistor R21, capacitor C12, and diode rectifier bridge DB of the power supply module 1. When the voltage across capacitor C13 continuously rises, the voltage across resistor R19 of the voltage divider rises to a certain level, which triggers the first transistor Q4 to become conductive. Therefore, the relay coil RELAY and the first transistor Q4 form a current path, which causes the relay coil RELAY to pull the replay plunger to close the switch SW. As a result, the electrical power is connected to the output end. This way, the leakage current protection device can be manually reset (by depressing and releasing the reset switch RESET) after the external power is resumed.

To summarize, the second reset module 6 functions to override the first reset module 5 and automatically set the leakage current protection device in a disconnected state upon power resumption. In such a state, the device is can be manually reset by closing and opening the reset switch RESET.

The leakage current protection device in this embodiment has a manual (non-automatic) reset function, and is suitable for electrical appliances that are expected not to automatically be reconnected when power is resumed after a power outage, to ensure their safety. The leakage current protection device with manual reset function according to this embodiment can use the second reset module 6 to keep the leakage current protection device disconnected (i.e. not reset) when power is resumed after a power outage, which satisfies the safety requirement of some appliances.

In the above embodiments, the self-testing module is optional.

It will be apparent to those skilled in the art that various modification and variations can be made in the leakage current protection device of the present invention without departing from the spirit or scope of the invention. Thus, it is intended that the present invention cover modifications and variations that come within the scope of the appended claims and their equivalents.

What is claimed is:

1. A leakage current protection device with automatic reset after power outage and resumption, comprising:
   power lines having an input end and an output end;
   a switch module coupled on the power lines, configured to electrically connect or disconnect the input end and the output end;
   a power supply module coupled to the input end, configured to generate a working power;
   a leakage current detection module coupled to the power lines on the output side, configured to detect whether a leakage current is present on the power lines on the output side and to generate a leakage current signal when a leakage current is detected;
   a drive control module coupled to the leakage current detection module and the switch module, configured to drive the switch module in response to the leakage current signal received from the leakage current detection module to electrically disconnect the input end and the output end; and
   a reset module coupled to the power supply module and the drive control module, configured to automatically control the drive control module to drive the switch module to electrically connect the input end and output end when power is resumed at the input end after a power outage;
   wherein the drive control module includes:
     a relay coil coupled to the reset module, configured to control the switch module;
     a drive control circuit coupled to the relay coil and the leakage current detection module, configured to control a current through the relay coil based on the received leakage current signal; and
     a manual reset switch coupled to the drive control circuit, configured to reset the drive control circuit after the leakage current signal is received; and
   wherein the drive control circuit includes:
     a transistor having a current path coupled in parallel with the reset switch, and having a control electrode coupled to the leakage current detection module to receive the leakage current signal;
     wherein the transistor is configured to become conductive in response to receiving the leakage current signal at its control electrode, and configured to become non-conductive in response to the reset switch being closed, and
     wherein the current path of the transistor is coupled in parallel with a current path of the relay coil.

2. The leakage current protection device of claim 1, wherein the power supply module is configured to supply a working power to the drive control module.

3. The leakage current protection device of claim 1, further comprising a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault;
   wherein the drive control circuit of the drive control module is further coupled to the self-testing module and configured to control the relay coil based on the self-test fault signal received from the self-testing module.

4. A leakage current protection device with automatic reset after power outage and resumption, comprising:
   power lines having an input end and an output end;
   a switch module coupled on the power lines, configured to electrically connect or disconnect the input end and the output end;
   a power supply module coupled to the input end, configured to generate a working power;
   a leakage current detection module coupled to the power lines on the output side, configured to detect whether a leakage current is present on the power lines on the output side and to generate a leakage current signal when a leakage current is detected;
   a drive control module coupled to the leakage current detection module and the switch module, configured to drive the switch module in response to the leakage current signal received from the leakage current detection module to electrically disconnect the input end and the output end; and
   a reset module coupled to the power supply module and the drive control module, configured to automatically control the drive control module to drive the switch module to electrically connect the input end and output end when power is resumed at the input end after a power outage;
   wherein the drive control module includes:
     a relay coil coupled to the reset module, configured to control the switch module;
     a drive control circuit coupled to the relay coil and the leakage current detection module, configured to control a current through the relay coil based on the received leakage current signal; and
     a manual reset switch coupled to the drive control circuit, configured to reset the drive control circuit after the leakage current signal is received; and
   wherein the reset module includes:
     a capacitor coupled between the power supply module and ground;
     a first resistor and a second resistor coupled in series to form a voltage divider circuit, wherein the voltage divider circuit is coupled in parallel to the capacitor; and
     a transistor having a current path coupled in series with the relay coil and a control electrode coupled to the voltage divider circuit;
     wherein the power supply module is configured to charge the capacitor when power is resumed at the input end, wherein the voltage divider circuit triggers the transistor to become conductive based on a charged voltage of the capacitor, and wherein when the transistor is conductive, a current flows through the relay coil and the relay coil controls the switch module to electrically connect the input end and the output end.

5. The leakage current protection device of claim 4, wherein the transistor is a MOS (metal-oxide-semiconductor) transistor, a silicon controlled rectifier, or a bipolar junction transistor.

6. The leakage current protection device of claim 4, wherein the power supply module is configured to supply a working power to the drive control module.

7. The leakage current protection device of claim 4, further comprising a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault;
- wherein the drive control circuit of the drive control module is further coupled to the self-testing module and configured to control the relay coil based on the self-test fault signal received from the self-testing module.

8. A leakage current protection device with manual reset after power outage and resumption, comprising:
- power lines having an input end and an output end;
- a switch module coupled on the power lines, configured to electrically connect or disconnect the input end and the output end;
- a power supply module coupled to the input end, configured to generate a working power;
- a leakage current detection module coupled to the power lines on the output side, configured to detect whether a leakage current is present on the power lines on the output side and to generate a leakage current signal when a leakage current is detected;
- a drive control module coupled to the leakage current detection module and the switch module, configured to drive the switch module in response to the leakage current signal received from the leakage current detection module or a trip signal to electrically disconnect the input end and the output end; and
- a reset module coupled to the input end and the drive control module, configured to automatically generate the trip signal when power is resumed at the input end after a power outage, wherein in response to the trip signal, the drive control module drives the switch module to electrically disconnect the input end and output end;
- wherein the drive control module includes:
  - a relay coil coupled to the reset module, configured to control the switch module;
  - a drive control circuit coupled to the relay coil and the leakage current detection module, configured to control the relay coil based on the received leakage current signal or the trip signal; and
  - a manual reset switch coupled to the drive control circuit, configured to reset the drive control circuit after the leakage current signal or the trip signal is received;
- wherein the drive control circuit includes:
  - a transistor having a current path coupled in parallel with the reset switch, and having a control electrode coupled to the leakage current detection module and the reset module to receive the leakage current signal and the trip signal;
  - wherein the transistor is configured to become conductive in response to receiving the leakage current signal or the trip signal at its control electrode, and configured to become non-conductive in response to the reset switch being closed, and
  - wherein the current path of the transistor is coupled in parallel with a current path of the relay coil.

9. The leakage current protection device of claim 8, wherein the transistor is a MOS (metal-oxide-semiconductor) transistor, a silicon controlled rectifier, or a bipolar junction transistor.

10. The leakage current protection device of claim 8, further comprising a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault;
- wherein the drive control circuit of the drive control module is further coupled to the self-testing module and configured to control the relay coil based on the self-test fault signal received from the self-testing module.

11. A leakage current protection device with manual reset after power outage and resumption, comprising:
- power lines having an input end and an output end;
- a switch module coupled on the power lines, configured to electrically connect or disconnect the input end and the output end;
- a power supply module coupled to the input end, configured to generate a working power;
- a leakage current detection module coupled to the power lines on the output side, configured to detect whether a leakage current is present on the power lines on the output side and to generate a leakage current signal when a leakage current is detected;
- a drive control module coupled to the leakage current detection module and the switch module, configured to drive the switch module in response to the leakage current signal received from the leakage current detection module or a trip signal to electrically disconnect the input end and the output end; and
- a reset module coupled to the input end and the drive control module, configured to automatically generate the trip signal when power is resumed at the input end after a power outage, wherein in response to the trip signal, the drive control module drives the switch module to electrically disconnect the input end and output end;
- wherein the drive control module includes:
  - a relay coil coupled to the reset module, configured to control the switch module;
  - a drive control circuit coupled to the relay coil and the leakage current detection module, configured to control the relay coil based on the received leakage current signal or the trip signal; and
  - a manual reset switch coupled to the drive control circuit, configured to reset the drive control circuit after the leakage current signal or the trip signal is received;
- wherein the reset module includes:
  - a first resistor and a second resistor coupled to the input end;
  - a third resistor and a capacitor couple in parallel with each other and then coupled in series with the first resistor;
  - a transistor having a current path coupled in series with the second resistor and a control electrode coupled to a node between the first resistor and the third resistor; and
  - a diode coupled from a node between the second resistor and the transistor to the drive control circuit, wherein the second resistor and the diode generate the trip signal when power is resumed at the input end after a power outage.

12. The leakage current protection device of claim 11, wherein the transistor is a MOS (metal-oxide-semiconductor) transistor, a silicon controlled rectifier, or a bipolar junction transistor.

13. The leakage current protection device of claim 11, wherein after the trip signal is generated, when the input end charges the capacitor to a predetermined voltage, a voltage across the capacitor triggers the transistor to become conductive which stops the trip signal.

14. The leakage current protection device of claim 13, wherein when a voltage applied at the input end is lower than the predetermined voltage, the transistor is non-conductive, and the second resistor and the diode generate the trip signal.

15. The leakage current protection device of claim 11, further comprising a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault;
wherein the drive control circuit of the drive control module is further coupled to the self-testing module and configured to control the relay coil based on the self-test fault signal received from the self-testing module.

16. A leakage current protection device with manual reset after power outage and resumption, comprising:
power lines having an input end and an output end;
a switch module coupled on the power lines, configured to electrically connect or disconnect the input end and the output end;
a power supply module coupled to the input end, configured to generate a working power;
a leakage current detection module coupled to the power lines on the output side, configured to detect whether a leakage current is present on the power lines on the output side and to generate a leakage current signal when a leakage current is detected;
a drive control module coupled to the leakage current detection module and the switch module, configured to drive the switch module in response to the leakage current signal received from the leakage current detection module or a trip signal to electrically disconnect the input end and the output end, wherein the drive control module includes:
a relay coil coupled to the reset module, configured to control the switch module;
a drive control circuit coupled to the relay coil and the leakage current detection module, configured to control the relay coil based on the received leakage current signal or the trip signal; and
a manual reset switch coupled to the drive control circuit, configured to reset the drive control circuit after the leakage current signal or the trip signal is received;
a reset module coupled to the input end and the drive control module, configured to automatically generate the trip signal when power is resumed at the input end after a power outage, wherein in response to the trip signal, the drive control module drives the switch module to electrically disconnect the input end and output end; and
another reset module, including:
a capacitor coupled between the power supply module and ground;
a first resistor and a second resistor coupled in series to form a voltage divider circuit, wherein the voltage divider circuit is coupled in parallel to the capacitor; and
a transistor having a current path coupled in series with the relay coil and a control electrode coupled to the voltage divider circuit;
wherein the power supply module is configured to charge the capacitor when power is resumed at the input end, wherein the voltage divider circuit triggers the transistor to become conductive based on a charged voltage of the capacitor, and wherein when the transistor is conductive, a current flows through the relay coil, and the relay coil controls the switch module to electrically connect the input end and the output end.

17. The leakage current protection device of claim 16, further comprising a self-testing module coupled to the input end and the leakage current detection module, configured to periodically generate a self-test pulse signal that simulates the leakage current to test whether the leakage current detection module has a fault, and to generate a self-test fault signal when the leakage current detection module has a fault;
wherein the drive control circuit of the drive control module is further coupled to the self-testing module and configured to control the relay coil based on the self-test fault signal received from the self-testing module.

* * * * *